United States Patent [19]

Hutchison

[11] Patent Number: 4,459,731
[45] Date of Patent: Jul. 17, 1984

[54] CONCENTRIC INSULATED TUBING STRING

[75] Inventor: S. O. Hutchison, Bakersfield, Calif.

[73] Assignee: Chevron Research Company, San Francisco, Calif.

[21] Appl. No.: 431,871

[22] Filed: Sep. 30, 1982

Related U.S. Application Data

[62] Division of Ser. No. 182,364, Aug. 29, 1980, abandoned.

[51] Int. Cl.³ .................. B23Q 17/00; B23P 11/02
[52] U.S. Cl. ........................... 29/405; 29/446; 29/451; 285/332.3
[58] Field of Search ............ 29/446, 455 R, 405, 29/451; 285/47, 53, 133 A, 149, DIG. 5, 332.3, 321

[56] References Cited

U.S. PATENT DOCUMENTS

| | | | |
|---|---|---|---|
| 2,150,221 | 3/1939 | Hinderliter | 285/332.3 |
| 2,812,958 | 11/1957 | Rogers | 285/321 X |
| 2,924,245 | 2/1960 | Wilson | 29/455 R X |
| 2,980,451 | 4/1961 | Taylor et al. | 285/332.3 |
| 3,511,282 | 5/1970 | Willhite et al. | 285/47 X |
| 3,574,357 | 4/1971 | Alexandru | 285/47 |
| 3,794,358 | 2/1974 | Allen et al. | 285/47 |
| 3,850,714 | 11/1974 | Adorjan | 285/47 X |
| 4,054,158 | 10/1977 | Hoeman et al. | 285/47 X |
| 4,332,401 | 6/1982 | Stephenson et al. | 285/53 X |
| 4,340,245 | 7/1982 | Stalder | 285/47 X |

Primary Examiner—Charlie T. Moon
Attorney, Agent, or Firm—G. W. Wasson; L. S. Gruber; Edward J. Keeling

[57] ABSTRACT

An improved insulated tubing string with insulated coupling formed of concentric tubing members insulated from each other to prevent heat from the inner tubing from being conducted to and through the outer tubing. The coupling joins the outer tubing of successive tubing assemblies to provide additional strength to the string and the inner tubing is insulated within the coupling to prevent heat loss at the coupling. The inner tubing is elongated during fabrication and joined to the outer tubing when elongated to reduce heat stress on the string when in use.

1 Claim, 6 Drawing Figures

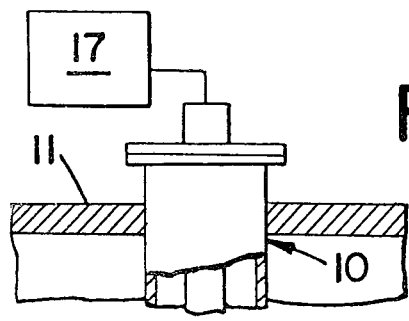
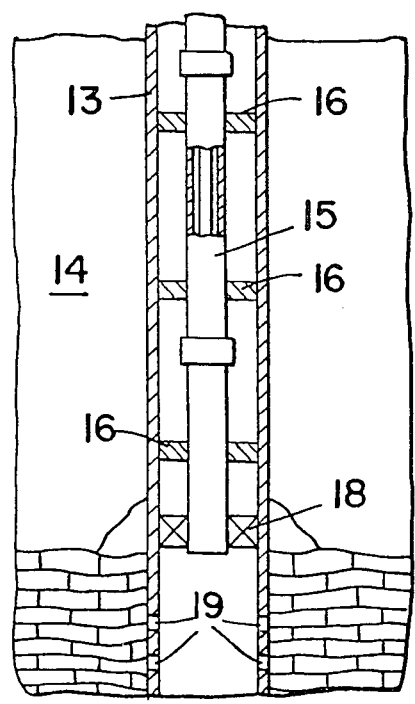
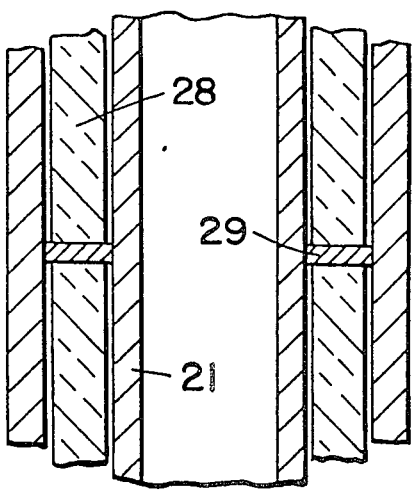
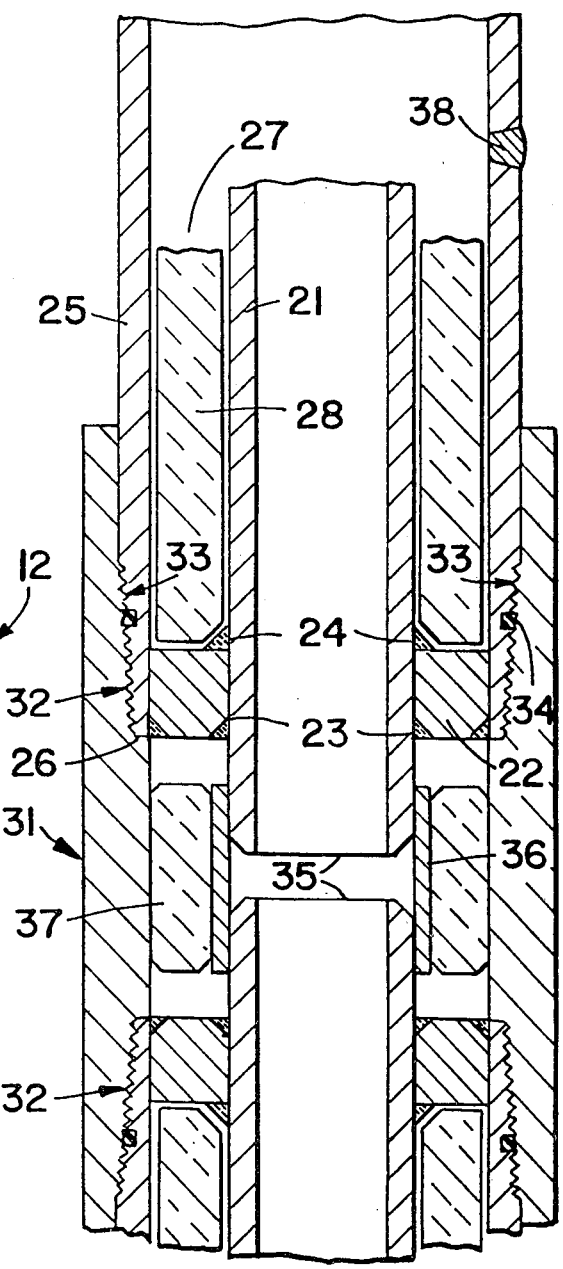
FIG_1
FIG_2
FIG_3

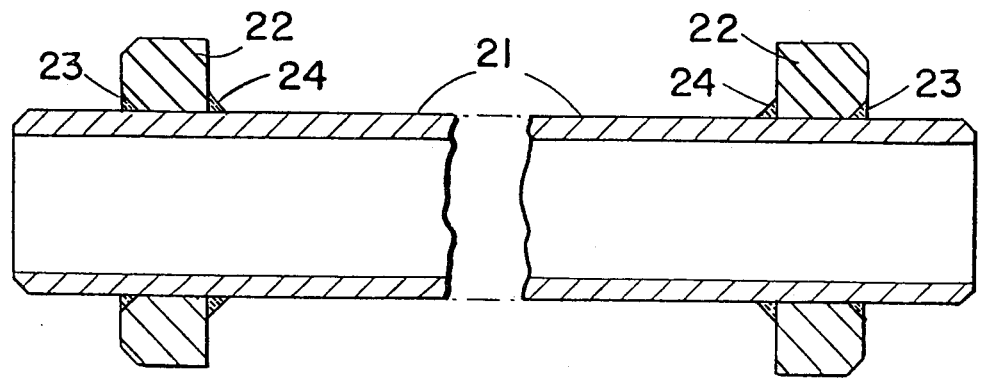
FIG_4
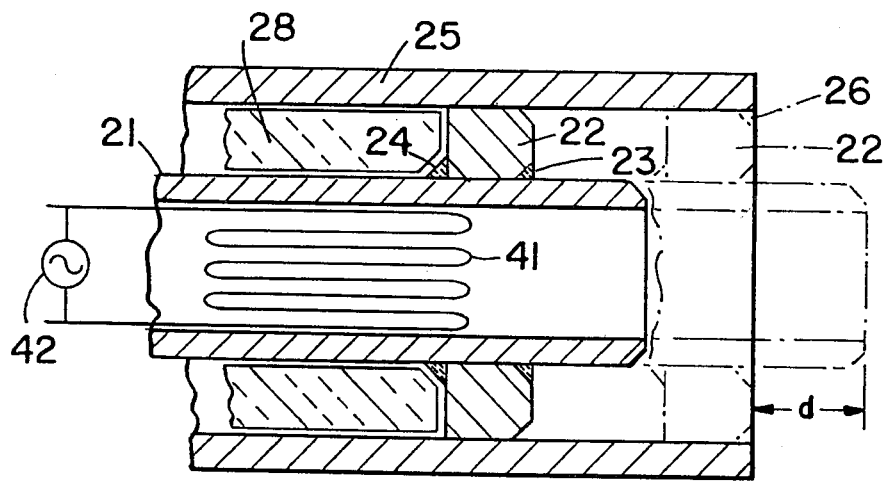
FIG_5
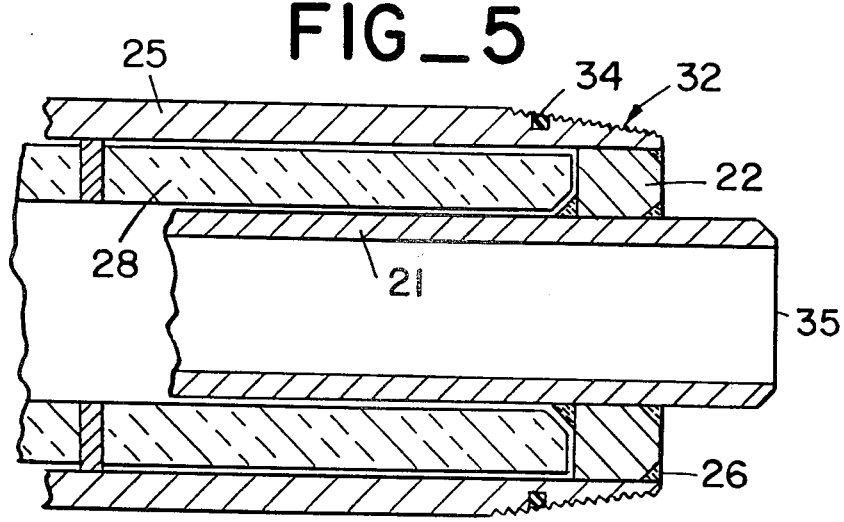
FIG_6

CONCENTRIC INSULATED TUBING STRING

This is a division of application Ser. No. 182,364, filed Aug. 29, 1980, now abandoned.

BACKGROUND OF THE INVENTION

When steam flooding a subsurface petroleum-containing formation, steam is usually generated at the earth's surface and injected into the subsurface formation from a cased well. The steam is usually transported to the producing formation through a conduit run inside the casing within the well. In a successful steam flood operation, the injection of steam into the target formation is maximized, while the loss of heat from the steam as it is transported from the surface to the target formation through the well conduit is minimized. Thermal insulation between the steam carrying conduit and the formation has been proposed as a means for reducing heat loss from the steam conduit to the formation. The construction of insulated conduit sections and the joining of sections of such insulated conduit into a concentric insulated tubing string is the subject matter of this invention.

PRIOR ART

Prior art systems have disclosed both preinsulated conduit sections and the application of insulation to the conduit after the conduit has been run into a well.

The application of insulation in place has the disadvantage of being uninspectable, both for initial application and subsequent failure. One form of application of insulation in place is shown in U.S. Pat. No. 3,525,399.

In prior art preinsulated conduits, concentric string conduits have been proposed with insulating materials positioned between concentric tubing sections. Such prior art concentric tubing sections have included several schemes for construction including schemes for accommodating a difference in thermal elongation of the steam conduit with respect to the insulated conduit of the concentric tubing. Concentric tubing for injection into or production from a subsurface formation is shown in U.S. Pat. Nos. 3,608,640 and 3,680,631 and is available from General Electric Company in a product sold under the tradename of "Thermocase III".

SUMMARY OF THE INVENTION

The prior art concentric insulated tubing conduits or strings have been inefficient in field use where steam flooding has been the objective because of heat loss at the coupling between sections of conduits. A coupling used to join the adjacent sections of conduit becomes heated to substantially the same temperature as the conduit carrying the steam and the coupling then is a source of heat loss.

One of the prior art conduits provides threaded ends at each end of the internal tubing of the conduit sections and a coupling joining the internal tubing. The coupling of sections by threads on the internal tubing places excessive tension strain on the assembled injection conduit. Mechanical failure and excessive heat loss at such coupling joints has been observed.

The present invention proposes an insulated, concentric tubing, steam injection (or production) conduit wherein the conduit is assembled from sections of concentric insulated tubing with a coupling that joins the sections together at threaded portions on the exterior of the outer tubing. The coupling is adapted to insulate the inner tubing against heat loss as sections of the concentric tubing are joined together.

Individual concentric tubing sections are manufactured by a procedure that establishes an isolated space between the outside of the inner tubing and the inside of the outer tubing. The inner tubing is elongated by heat expansion prior to being attached to and insulated from the outer tubing. The outer tubing is then dressed and threaded for cooperation with an external coupling.

The coupling joining tubing sections provides insulation at the joint and mechanical strength for an assembled string.

The objects and features of the present invention will be readily apparent to those skilled in the art from the appended drawings and specification illustrating a preferred embodiment.

BRIEF DESCRIPTION OF THE DRAWINGS

FIG. 1 is a sectional view through an earth formation illustrating the apparatus of the present invention in use.

FIG. 2 is a sectional view of the apparatus of the present invention showing the coupling of two sections of insulated concentric tubing conduit.

FIG. 3 is a sectional view of the apparatus of the present invention intermediate the ends showing the insulation and spacing between concentric tubing.

FIG. 4 is a sectional view of the inner tubing prior to its attachment to the outer tubing.

FIG. 5 is a sectional view of the inner and outer tubing prior to heat expansion.

FIG. 6 is a sectional view of the end of an assembled insulated concentric tubing section.

FIG. 1 is a sectional view through an earth formation illustrating the present invention in its installed position within a cased well. As illustrated, a well 10 is drilled from the earth's surface 11 to an oil-bearing formation 12. A typical oil-bearing reservoir to which the present invention has application includes a formation containing viscous crude oil which cannot be produced to the earth's surface under formation pressure and temperature. A technique for stimulating the production of a viscous crude oil from such a subsurface oil reservoir is to inject steam into that reservoir through a steam injection well to heat the oil and reduce its viscosity. As herein illustrated, the injection well includes a metal casing 13 passing through the formation 14 to the subsurface horizon of the formation 12. A steam injection conduit 15 is positioned inside the casing 13 and spaced by suitable spacing means 16 to conduct steam from a surface steam generating source 17 to the subsurface formation 12. A packer 18 is usually provided at the downhole end of the steam conduit 15 to prevent steam from flowing back up the annulus between the conduit and the casing. The casing is perforated, as at 19, at the location of the oil-bearing formation to provide conduits into and out of the permeable oil-bearing formation.

FIGS. 2 and 3 illustrate in sectional form the construction of the concentric tubing steam injection conduit as illustrated generally in FIG. 1. It should be understood that FIG. 2 illustrates the adjacent ends of two concentric tubing sections adjoined by a coupling means so as to produce a continuous portion of a steam injection conduit or string of the type illustrated in FIG. 1. Each of the individual concentric tubing conduit sections is made up of an inner tubing 21 having an annular end member 22 secured to the exterior surface of the inner tubing, as by being welded thereto at 23 and 24. The outer surface of the annular member 22 is secured to the inner surface adjacent to the end of an outer tubing section 25. The connection between the annular end member 22 and the outer tubing 25 is establihsed by welding the end of the annular member, as at 26, to the end of the outer tubing section.

The annular space 27 between the outside of the inner tubing and the inside of the outer tubing is filled with an insulating material 28. The insulating material may be formed of tubular sections which are inserted over the outside of the inner tubing when the inner tubing is inserted into the outer tubing. The tubular sections of insulating material may be split longitudinally to fit around the inner tubing during assembly.

Between sections of the insulating materials, ring-like spacers 29, shown in FIG. 3, are provided to maintain positioning of the insulating material 28 and to prevent the collapse of the outer tubing onto the insulation and inner tubing, thus destroying the insulating qualities of the insulation material.

As particularly shown in FIG. 2, individual sections of the concentric tubing string are joined together by a coupling member generally designated 31. The coupling is a hollow cylindrical form with female threads on the inside of each end thereof at 32. The ends of the outside tubing 25 of the concentric tubing string are threaded with male threads at 33 to match with the internal threads of the coupling. Both of these threads are conventional oil field pipe threads being tapered to provide a wedge tightening for the coupling. A sealing resilient ring 34 is positioned in the grooves cut into the interior of the coupling and the exterior of the outer tubing to provide both sealing and protection for the mating of the two threads. The inner tubing 21 of the concentric string 15 extends beyond the threaded end of the outer tubing 25, as at 35, and is adapted to be fitted with a deflector ring 36. An insulating hollow cylinder 37 surrounds the deflector ring 36 and encloses the ends of the extension of the inner tubing to insulate the coupling from the hot fluid which may be pumped down through the inner conduit.

When assembled in the form as shown in FIG. 2, the two sections of concentric tubing string may form a portion of the overall string extending through the earth formation to carry hot fluids, or steam, through the inner conductor in a manner to insulate the temperature of the inner tubing from the outer tubing. To further improve the insulation characteristic of the space between the inner tubing and the outer tubing, the remaining space may be filled with an inert gas having low heat carrying characteristics. For that purpose, the outer tubing may be provided with a plug member 38 through which the insulating gas may be pumped.

FIGS. 4, 5 and 6 illustrate a preferred manner for constructing the concentric tubing string of the present invention. As illustrated in FIG. 4, the inner tubing 21 is first provided with an annular end member 22 at each end and the inside surface of each end member 22 is welded at 23 and 24 to the outside surface of the inner tubing 21 to establish complete sealing of the annular member against the outer surface of the inner tubing. The inner tubing 21 is then inserted into the outer tubing 25 as shown in FIG. 5 and insulating material 28 is installed to surround the inner tubing as the tubing is inserted into the outer tubing. For that purpose, the cylindrical insulation may be in the form of a split cylinder to permit it to be placed around the inner tubing as the inner tubing is inserted. The spacer members 29 also are placed around the inner tubing 21 between adjacent insulation sections. The spacers may be formed as split rings to permit them to be assembled around the inner tubing.

After a concentric tubing section has been assembled as described, a heating element 41 connected to an energy source 42, as schematically illustrated in FIG. 5, is placed within the interior of the inner tubing to heat it along its entire length. While FIG. 5 illustrates a short portion only of the heating element, it should be understood that it is preferred that the entire length of the inner tubing within the outer tubing is heated. As the inner tubing becomes heated, it expands in length. If one end of the inner tubing is held in place with respect to the outer tubing, by clamping or by having first been welded thereto, as at 26, the other free end of the inner tubing will expand axially to extend toward the other end of the outer tubing. When the inner tubing has been expanded to a desired length, the outer surface of the annular end member 22 at the free end is welded at 26 to the inner surface of the outer tubing. In the welded position, the inner tubing extends a predetermined distance, shown as d in FIG. 5, beyond the end of the outer tubing. If the fixed end of the inner tubing had only previously been clamped to the other tubing, that end is then also welded, as at 26, to the inside of the outer tubing.

When the welding between the annular end member 22 and the outer tubing 25 is completed to securely fasten the inner and outer tubing sections together, the inner tubing is in an elongated condition and the heating element is then withdrawn permitting the inner tubing member to cool. When cooled, the inner tubing is placed in tension as it attempts to contract but it is maintained at its elongated length by its connection at both ends to the inner surface of the outer tubing. As shown in FIG. 6, the end of the outer tubing is then dressed at 44 and the male threads 32 are cut into the outer surface. The slot accomodating the sealing ring 34 is then machined and the section of concentric tubing is available for assembly with other tubing sections.

Because of the manner in which the concentric tubing sections have been fabricated, placing the inner member in tension when in cooled condition but in relaxed (expanded) condition when in heated condition, and because of the insulation between inner and outer tubings, the assembled concentric tubing string of the present invention provides a conduit for the conduction of hot fluids with minimized heat loss and with reduced coupling stress. A particular feature of the present invention is that the joint between successive sections of the concentric tubing strings is formed by coupling the outer tubing of each of the members, thus providing additional strength to the overall concentric tubing. With the construction here described, the outer tubing may be made of heavier gauge pipe capable of supporting greater weight in the assembled tubing string. Also, because the fabricated sections are substantially unstressed at operating temperature, the assembled tubing string is less likely to fail due to fatigue. When assembled with the coupling, as shown in FIG. 2, the entire string of concentric tubing sections is substantially completely insulated from the earth formation and the interior of the casing, thus reducing the heat loss in transporting the hot fluids or steam through the subsurface formation. When the steam has been carried to the horizon where the oil-bearing formation is found, the steam may be forced out of the end of the tubing string and into the formation 12 through the perforations 19 with the packing gland 18 preventing steam from passing up through the annulus around the tubing string and inside of the casing.

While a certain preferred embodiment of the invention has been specifically disclosed, it should be understood that the invention is not limited thereto as many variations will be readily apparent to those skilled in the art and the invention is to be given its broadest possible interpretation within the terms of the following claims.

What is claimed is:

1. A method for producing an insulated, concentric tubing, hot fluid conducting apparatus comprising the steps of:

attaching annular end members to the outer surface of a first tubing adjacent to the ends thereof, heating said first tubing to about the temperature of hot fluids to be conducted in said apparatus to elongate said first tubing, internally threading a hollow cylindrical coupling, threading said second tubing at the outer surfaces adjacent to the ends thereof and about where said annular end members are secured so as to permit multiple units of said insulated concentric tubing to be joined by coupling members, cutting a first annular groove into said threading of said coupling, cutting a second annular groove into said exterior threading of said second tubing, inserting said first tubing inside said second tubing with spacing and insulating materials between the outside of said first tubing and the inside of said second tubing, said second tubing having a shorter axial length than said first tubing when said first tubing is elongated due to said heating, securing said annular end members to the inner surface of said second tubing adjacent to the ends thereof when said first tubing is elongated due to said heating and sealing said inner space between said first and second tubing containing said spacing and insulating materials, positioning a resilient sealing ring in one of said first and said second grooves, and engaging said second tubing with said cylindrical coupling at said threaded outer surfaces such that said ring engages the other of said first and second grooves.

* * * * *

UNITED STATES PATENT AND TRADEMARK OFFICE
CERTIFICATE OF CORRECTION

PATENT NO. : 4,459,731

DATED : July 17, 1984

INVENTOR(S) S.O. Hutchison

It is certified that error appears in the above-identified patent and that said Letters Patent is hereby corrected as shown below:

On the title page Item (54) should read

-- Method of Producing Concentric Insulated Tubing --

Signed and Sealed this

Ninth Day of October 1984

[SEAL]

Attest:

GERALD J. MOSSINGHOFF

Attesting Officer

Commissioner of Patents and Trademarks